United States Patent [19]

Matis

[11] Patent Number: 4,621,293

[45] Date of Patent: Nov. 4, 1986

[54] INTEGRATED LENS AND CRT MOUNT FOR PROJECTION TV

[75] Inventor: Louis J. Matis, Lombard, Ill.

[73] Assignee: Zenith Electronics Corporation, Glenview, Ill.

[21] Appl. No.: 755,742

[22] Filed: Jul. 16, 1985

[51] Int. Cl.⁴ .......................... H04N 5/74; H04N 9/31
[52] U.S. Cl. .................................... 358/231; 358/60; 358/237; 358/254
[58] Field of Search .................. 358/60, 64, 231, 237, 358/238, 239, 245, 448, 249, 250, 254

[56] References Cited

U.S. PATENT DOCUMENTS

| | | | |
|---|---|---|---|
| 2,549,585 | 4/1951 | Epstein | 358/60 |
| 4,400,723 | 8/1983 | Fanizza | 358/60 |
| 4,404,588 | 9/1983 | Fanizza | 358/60 |
| 4,506,295 | 3/1985 | Young | 358/231 |
| 4,511,923 | 4/1985 | Bauer | 358/231 |

FOREIGN PATENT DOCUMENTS

| | | | |
|---|---|---|---|
| 2726877 | 12/1977 | Fed. Rep. of Germany | 358/60 |
| 106979 | 6/1983 | Japan | 358/60 |

*Primary Examiner*—Tommy P. Chin
*Attorney, Agent, or Firm*—Cornelius J. O'Connor

[57] ABSTRACT

An integrated multi-lens and multi-cathode ray tube (CRT) mount for a projection television receiver includes right and left lateral support panels and a flat front mounting panel coupled therebetween. The front mounting panel includes three generally circular apertures therein each adapted to receive a respective lens positioned on a forward surface of the mounting panel. Positioned adjacent to the upper and lower portions of each of the apertures of the mounting panel are respective pairs of alignment/positioning slots which are adapted to receive respective upper and lower mounting blocks on an aft surface of the mounting panel. Each of the upper and lower mounting blocks includes a pair of mounting bosses, with each pair of mounting blocks adapted to receive a respective CRT housing for securing each CRT to the aft surface of the mounting plate immediately aft of a respective aperture therein and in a given alignment and position such that all three video images are directed to a common projection area and are in proper relative angular orientation. Keying slots in each of the three mounting panel apertures are adapted to receive a respective lens mounting flange in a keyed manner for proper positioning and rotational orientation of each of the three lenses over a respective aperture within the mounting panel and in alignment with its associated CRT. Each of the three lens assemblies includes a respective mirror for directing the video image projected thereon onto a common upper mirror for reflection onto a rear projection screen.

13 Claims, 4 Drawing Figures

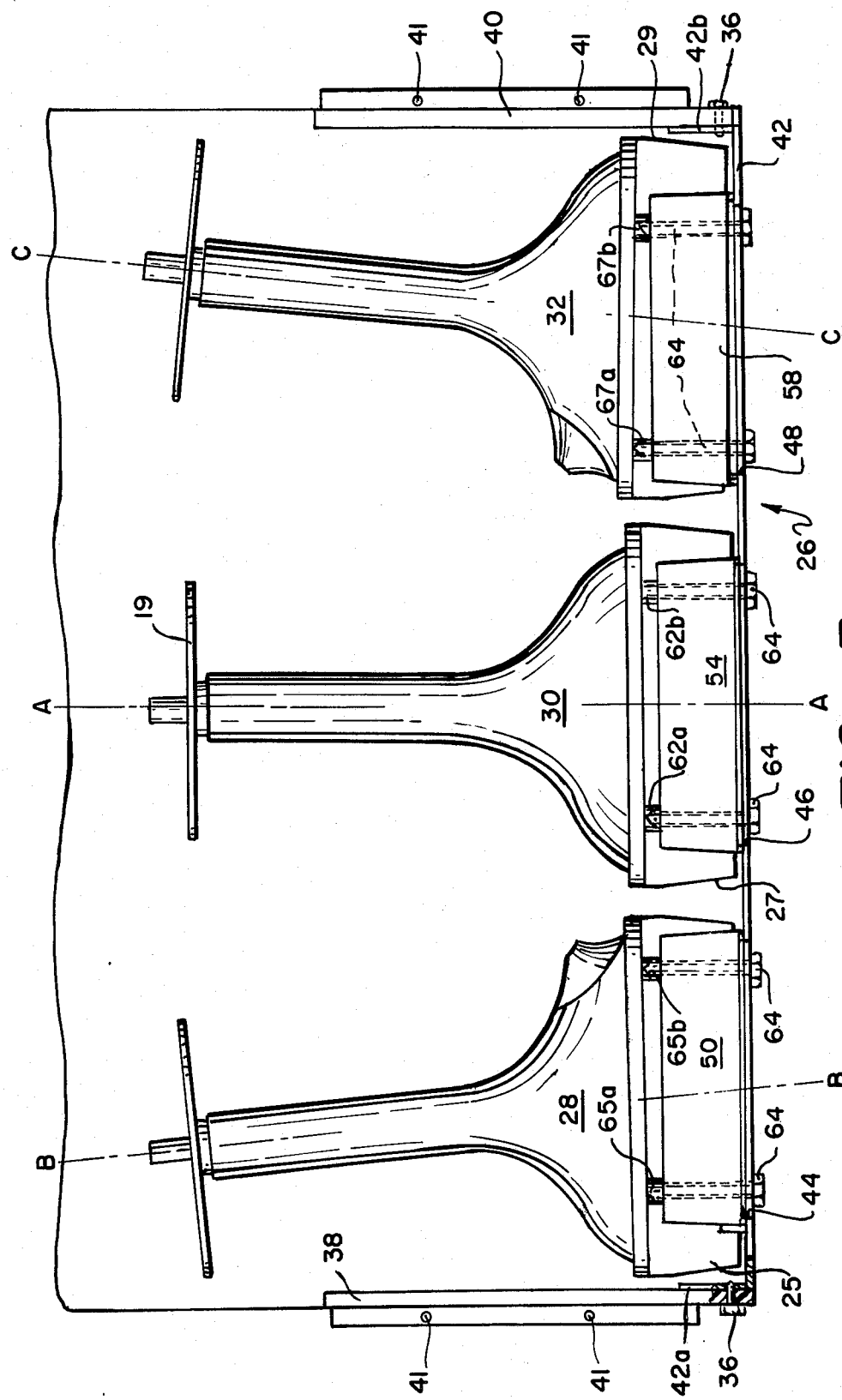

INTEGRATED LENS AND CRT MOUNT FOR PROJECTION TV

BACKGROUND OF THE INVENTION

This invention relates generally to projection television receivers and is particularly directed to an integrated multi-cathode ray tube (CRT) and lens mount for a projection television receiver.

In a projection television system, an image generated on the face plate of a CRT is magnified through a lens and projected onto a screen. In a color projection television system, there are three CRT's which separately display red, green, and blue images which are projected onto the screen in an overlayed arrangement. These three CRT's are typically arranged in a triad, or side-by-side, along a horizontal axis. In a multi-CRT color projection television, the images of each of the three CRT's must be precisely superimposed so that a single image appears upon the projection screen. Each image must be exactly the same size and shape to effect precise superposition. A center CRT is typically projected perpendicular to a screen or to a mirror which reflects the image onto the projection screen, while two outer CRT's are projected at respective angles relative to the optical axis of the center CRT such that superposition is achieved.

In some projection television systems, CRT alignment is provided by electronic image alignment circuitry which electronically compensates for projected image geometric distortions. However, adjustment of this electronic alignment circuitry is generally time-consuming and requires a high level of skill by the manufacturing assembler or one who repairs the projection television. Mechanical arrangements have also been proposed for the positioning and alignment of multiple CRT's in a projection television system. These mechanical mounting arrangements have typically involved a plurality of interconnected structural components which require tightening and adjustment for proper positioning of the CRT's in a mounting frame. The positioning of one CRT in the mounting frame generally affects the alignment of the other CRT's frequently resulting in image misregistration. With several different mounting components requiring adjustment to varying degrees, precise alignment of the three CRT optical axes becomes very difficult, if not impossible.

U.S. Pat. No. 4,404,588 to Fanizza et al discloses a CRT holding assembly for a projection television which employs three pods, each supporting a respective CRT. Each of the pods is, in turn, mounted by means of plurality of bolts to a platform. Each platform includes a cylindrical housing for holding the front piece of a CRT and a back cover which holds the CRT inside the housing. This arrangement therefore requires precise relative positioning of each of the CRT's within a respective housing as well as precise positioning of each housing upon the platform. U.S. Pat. No. 4,400,723 to Fanizza et al discloses a stationary optical assembly for a multi-CRT projection television including a CRT holding assembly, a mirror and a chassis mounting arrangement. The CRT holding assembly includes three pods mounted on an integral, respective base plate, with the base plates mounted, in turn, upon a bed plate. The chassis includes a plurality of threaded studs for mating with respective apertures in the pod-mounting base plates. While providing for the simplified and precise positioning of the CRT mounting assembly within the chassis, the CRT mounting assembly includes a plurality of individual components which must be fitted together and securely attached to a respective CRT as well as to a base or CRT holding assembly. The large number of connections required increases the likelihood of optical misregistration between the various CRT's.

U.S. Pat. No. 4,506,295 to Young et al discloses a unitary optics frame for a projection television receiver comprised of a plurality of tubular members interconnected to form a rigid skeletal structure. The skeletal structure incorporates various sub-frames to which the projection tubes, mirror assemblies and screen are mounted for maintaining the various positional relationships therebetween. While providing a unitary support structure for these projection television components, the orientation of these components in the support frame requires precise adjustment for proper alignment.

The present invention is intended to overcome the aforementioned limitations of the prior art by providing an integrated lens and CRT mount for a projection television receiver which affords precise positioning and alignment of the various CRT's and lenses therein without requiring a complicated position adjustment procedure. The integrated lens and CRT mount includes a unitary structure which is inexpensive, involves a minimum number of components, and facilitates the installation and alignment of the aforementioned projection television components without a complicated installation procedure or individual adjustment of the CRT's and lenses.

OBJECTS OF THE INVENTION

Accordingly, it is an object of the present invention to provide an improved arrangement for mounting a plurality of lengs and CRT combinations in a projection television receiver.

It is another object of the present invention to provide an integrated lens and CRT mount for a multi-CRT projection television receiver.

Yet another object of the present invention is to facilitate the installation and accurate positioning and alignment of a plurality of CRT-lens combinations in a projection television.

A further object of the present invention is to provide a low cost projection television CRT mount which affords precise and reliable positioning and alignment of multiple lens/CRT combinations in the projection television.

A still further object of the present invention is to provide an integrated structure for positioning a plurality of CRT's arranged in a linear array in a projection television receiver in precise mutual alignment and relative position to each other and to a mirror assembly as well as to a projection screen in the television receiver.

Another object of the present invention is to provide a multiple lens/CRT mounting assembly for a projection television receiver which facilitates replacement of a defective CRT while insuring proper optical alignment of the replacement CRT relative to the other CRT's.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a top planar view of the integrated lens and CRT mount assembly illustrated in FIG. 1 taken along sight line 3—3 therein.

DETAILED DESCRIPTION OF THE PREFERRED EMBODIMENT

Figure 1:
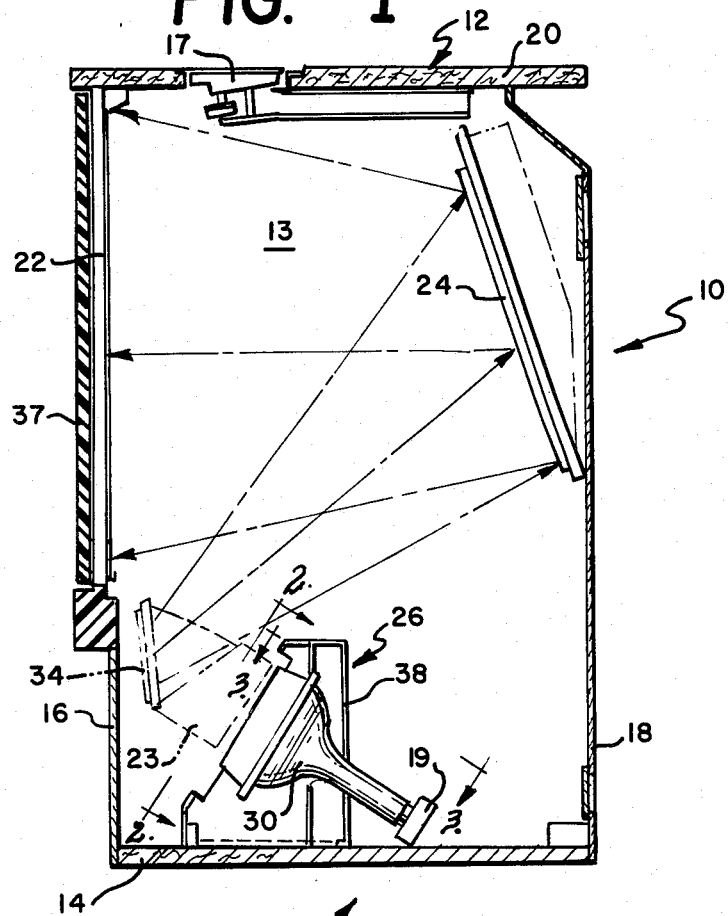
FIG. 1 is a lateral sectional view of a projection television receiver incorporating an integrated lens and CRT mount in accordance with the present invention.

Referring to FIG. 1, there is shown a lateral sectional view of a projection television receiver 10 incorporating an integrated lens and CRT mount 26 in accordance with the principles of the present invention.

The projection television 10 includes a cabinet 12 comprised of right and left generally vertical lateral panels, with the right lateral panel shown as element 13 in FIG. 1, a base or bottom panel 14, a top panel 20, and a speaker panel 16 on a forward portion of the cabinet. A back panel 18 is attached to an aft portion of the cabinet 12, while mounted on a forward portion of the cabinet is a rear projection screen 22. One or more movable doors 37 may be attached to a forward portion of the cabinet 12 so as to be positioned immediately adjacent to and forward of the projection screen 22. Also provided in the cabinet 12 is a control panel 17, which in FIG. 1 is shown positioned in the top panel 20. The cabinet 12 forms an enclosure within which is positioned various electronic components and circuitry (not shown) related to the processing of audio and video signals provided to the projection television receiver 10. Of these various electronic components and circuitry, only the CRT's and related lens assemblies associated with the integrated lens and CRT mount 26 of the present invention are shown in the various figures and discussed in detail in the following paragraphs.

As shown in FIG. 1, the integrated lens and CRT mount 26 is positioned on and mounted to the base 14 of the cabinet 12. The integrated lens and CRT mount 26 is adapted to securely maintain in position therein a plurality of CRT's, with a center CRT shown as element 30 in the figure. Each of the CRT's positioned in the mount 26 has associated therewith a respective lens assembly, where element 23 represents the lens assembly associated with the center CRT 30 in FIG. 1. Each of the lens assemblies includes a mirror 34 onto which the respective video image of an associated CRT is projected. The lens mirror 34, in turn, reflects the video image onto an upper mirror 24 securely mounted in an upper portion of the projection television's cabinet 12. The upper mirror 24 reflects the three CRT-generated video images upon the aft surface of the rear projection screen 22, with the video image thus visible on the front surface thereof. Attached to an aft portion of each of the CRT's is a respective CRT drive circuit 19 which provides appropriate video and electron beam control signals to the CRT for display of a video image on the faceplate thereof.

Figure 4:
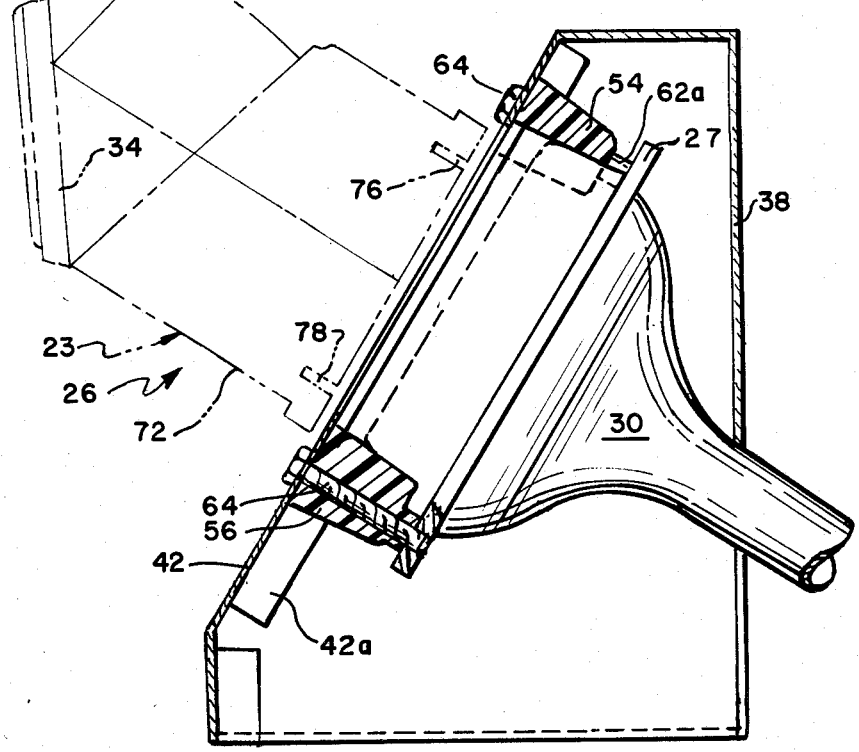
FIG. 4 is a sectional view of the integrated lens and CRT mount assembly of FIG. 2 taken along sight line 4—4 therein.
Figure 2:
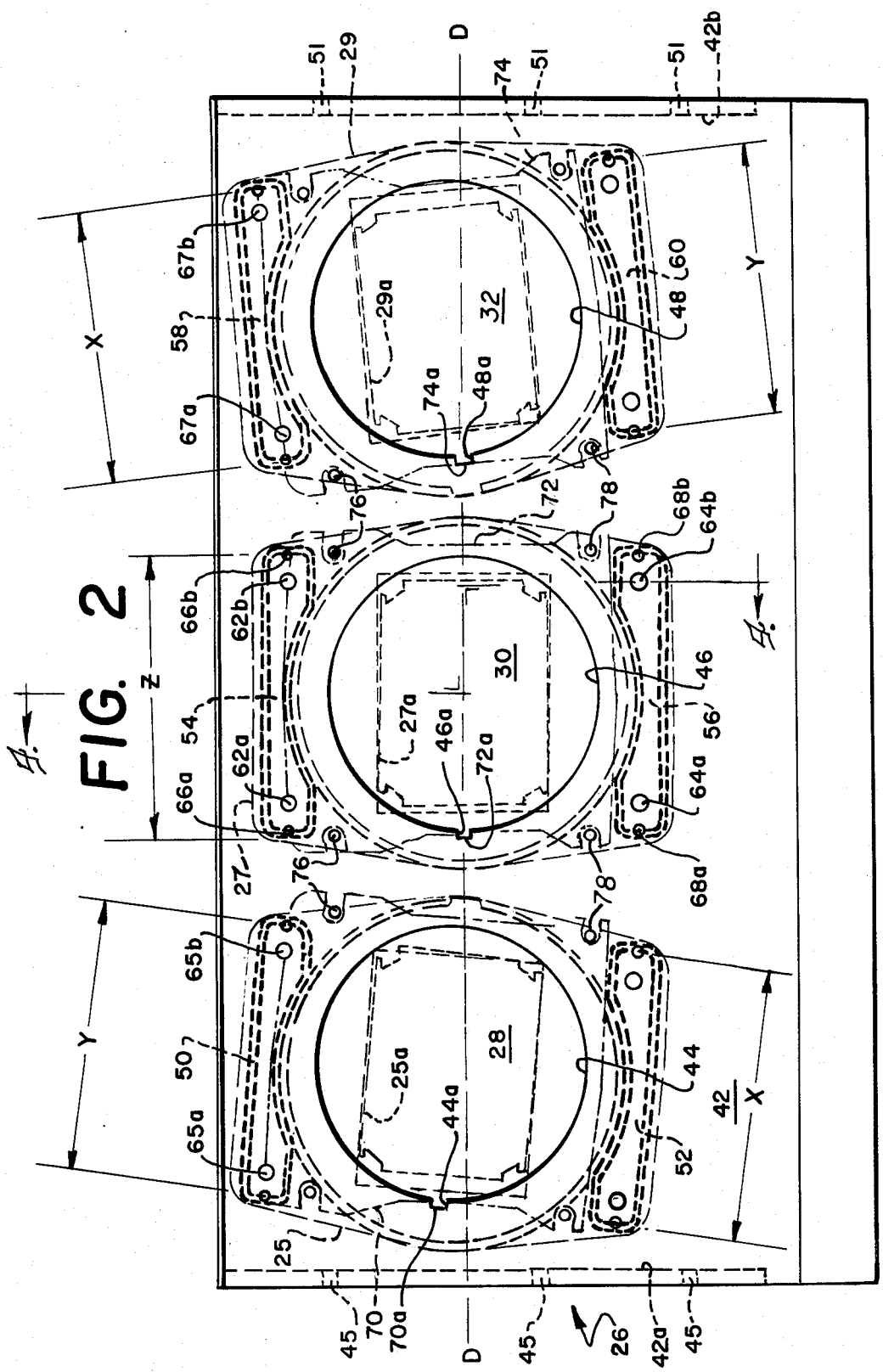
FIG. 2 is a face view of a front portion of the integrated lens and CRT mount of FIG. 1 taken along sight 2—2 therein.

Referring to FIGS. 2, 3 and 4, there are respectively illustrated front face, top planar, and lateral sectional views of the integrated lens and CRT mount 26 of the present invention. The front mounting plate 42 of the lens/CRT mount 26 includes right and left mounting flanges 42a, 42b, where the designations right and left are taken with the projection television receiver and lens/CRT mount viewed from the rear. Each of the right and left mounting plate flanges 42a, 42b includes a plurality of respective apertures 45, 51 therein for securely coupling the front mounting plate 42 to the right and left lateral panels 38, 40, respectively, by means of a plurality of coupling pins 36 such as screws as shown in FIG. 3. With the right and left lateral panels 38, 40 thus connected together by means of the front mounting plate 42, the three member lens/CRT mount 26 forms a rigid support structure adapted for secure and stable positioning within the projection television receiver's cabinet 12. In a preferred embodiment, the front mounting plate 42 and the right and left lateral panels 38, 40 are comprised of sheet metal, although each member could also equally as well be fabricated from a molded plastic. The lower portion of the lens/CRT mount 26 may be securely attached to the cabinet's base by means of a plurality of mounting pins 41 inserted through respective apertures in the lateral panel flanges as shown in FIG. 3.

The front mounting plate 42 of the lens/CRT mount 26 includes right, center and left apertures 44, 46 and 48 aligned in a generally linear arrangement therein. Positioned immediately above and below the right mounting plate aperture 44 are upper and lower mounting blocks 50, 52. Similarly, positioned immediately adjacent to and above and below the center mounting plate aperture 46 are respective upper and lower mounting blocks 54, 56. Finally, positioned immediately adjacent to and above and below the left mounting plate aperture 48 are respective upper and lower mounting blocks 58, 60. Each of the aforementioned mounting blocks includes an inner, curvilinear portion for receiving a respective forward portion of a CRT and a housing associated therewith and is precisely positioned upon and mounted to the aft surface of the front mounting plate 42 of the lens/CRT mount 26 in the following manner.

In the following description, the positioning and mounting of the center CRT 30 and various components associated therewith are described in detail, it being understood that the mounting arrangements of the right and left CRT's 28, 32 are similar to that of the center CRT. Differences in the positioning and mounting arrangements of the various CRT's are pointed out in the following description.

Positioned immediately above the center aperture 46 and within the mounting plate 42 are a pair of spaced apertures adapted to receive a respective upper positioning boss 66a, 66b positioned upon the upper mounting block 54. A similar pair of spaced apertures are located within the mounting plate 42 below the aforementioned center aperture 46 which are adapted to receive respective lower positioning bosses 68a and 68b positioned upon the lower mounting block 56. Similar pairs of mounting apertures are provided above and below the right and left mounting plate apertures 44, 48 to receive respective positioning bosses on each of the remaining upper mounting blocks 50, 58 and lower mounting blocks 52, 60. The distance between the mounting apertures above and below the center aperture is represented as the length Z which is the same for the upper and lower mounting blocks 54 and 56. Similarly, the distance between the mounting apertures above the right aperture 44 and below the left aperture 48 is represented as the length Y, while the distance between the mounting apertures above the left aperture 48 and below the right aperture 44 is represented as the length X. These various inter-mounting aperture lengths are selected such that $X \neq Y \neq Z$ so as to prevent the various mounting blocks from being improperly positioned upon the mounting plate 42. In this manner, the upper and lower center mounting blocks 54, 56 are interchangeable, the upper left and lower right mounting blocks 58, 52 are interchangeable, and the upper right and lower left mounting blocks 50, 60 are nterchangeable. Therefore, the integrated lens and CRT mount 26 of the present invention contemplates only three different configurations for the CRT mounting blocks used therein in an arrangement which ensures proper positioning and locating of each of the CRT mounting blocks upon the front mounting plate 42.

When positioned upon the aft surface of the front mounting plate 42 as described above, the upper and lower center mounting blocks 54, 56 are positioned symmetrically about the front mounting plate's center aperture 46 and are aligned with the vertical axis of the center aperture. The curvilinear portions of the upper and lower mounting blocks 54, 56 face inward toward the front mounting plate's center aperture 46 and, as indicated above, are adapted to receive a generally circular forward portion of the center CRT 30 and housing 27 associated therewith. With the CRT's housing engaged by the respective curvilinear portions of a pair of upper and lower mounting blocks, the CRT is securely maintained in position on the aft surface of the mounting plate 42 in alignment with a respective aperture therein. The right, center and left CRT housings 25, 27 and 29 each include a respective generally rectangular aperture 25a, 27a and 29a therein. Each of these CRT housing apertures is positioned immediately adjacent to and over a respective faceplate of its associated CRT to allow the video image to be projected therethrough and into a respective video lens assembly associated therewith. Each CRT housing is attached to a forward portion of the CRT during its manufacture in a conventional manner. The upper and lower center mounting blocks 54, 56 have extending rearward therefrom a respective pair of mounting bosses 62a, 62b and 64a, 64b within which a threaded coupling pin such as a screw 63 may be inserted from the forward side of the front mounting plate 42 for securing the mounting blocks to the front mounting plate. The upper and lower mounting blocks associated with the right and left CRT's 28, 32 include similar pairs of mounting bosses extending rearward therefrom for securely positioning each of these mounting blocks on the aft surface of the front mounting plate 42 by means of respective pairs of threaded coupling pins.

The optical axis of the center CRT 30 is indicated as dotted line A—A in FIG. 3 and defines the optical axis of the entire assembly of the three CRT's. Because all three CRT's must be focused and directed by means of a respective lens assembly to the same area defined on the upper mirror 24, the right and left CRT's 28, 32 must be aligned so as to point inwardly toward the common optical axis A—A. Respective pairs of upper and lower mounting blocks associated with the right and left CRT's 28, 32 provide for their inwardly directed alignment for proper focusing upon the upper mirror 24 in the following manner.

Referring specifically to the upper mounting block 50 of the right CRT 28 as shown in FIG. 3, and as previously described, the upper mounting block 50 is positioned upon the aft surface of the front mounting plate 42 and includes right and left upper mounting bosses 65a, 65b. The upper mounting block 50 is positioned upon the front mounting plate 42 by means of a threaded coupling pin (not shown in FIG. 3) inserted within each of the mounting bosses 65a, 65b from the forward surface of the mounting plate 42. As shown in FIG. 3, the right mounting bosses 65a is shorter than the left mounting boss 65b. With an aft portion of each of the right and left mounting bosses 65a, 65b engaging a portion of the right CRT housing 25, the right CRT housing will be maintained in a turned-in orientation relative to the front mounting plate 42. That is, the optical axis of the right CRT 28 positioned within the right CRT housing 25 which is designated as line B—B in FIG. 3 will be directed toward the optical axis A—A of the center CRT 30. Although not shown in the figure, it is understood that the lower right mounting block associated with the right CRT 28 and right CRT housing 25 is similarly provided with mounting bosses of different lengths wherein the length of the outer mounting boss is less than that of the inner mounting boss. With the upper and lower mounting blocks mounted in a flush manner to the aft surface of the mounting plate 42 and with each of the aforementioned mounting blocks having associated therewith a pair of mounting bosses, each having a predetermined length, the right CRT 28 may be positioned upon the mounting plate such that its optical axis B—B and the optical axis A—A of the center CRT 30 are coincident upon a common area such as on the upper mirror 24. From FIG. 3, it can be seen that the upper mounting block 58 associated with the left CRT 32 and its associated housing 29 similarly includes right and left mounting bosses 67a, 67b of different lengths, wherein the right mounting boss 67a is longer than the left mounting boss 67b. A similar arrangement is provided for in the left CRT's lower mounting block which is not shown in FIG. 3. By thus configuring the upper and lower mounting blocks which engage the left CRT housing 29, the optical axis C—C of the left CRT 32 is directed inwardly so as to conicide with the optical axis of the center CRT 30 and the right CRT 28 which are respectively designated A—A and B—B. It should be noted here that the right and left mounting bosses 62a, 62b of both the upper and lower center CRT mounting blocks 54, 56 are of equal length to ensure that the optical axis A—A of the center CRT 30 is oriented generally transverse to the plane of the front mounting plate 42. In this manner, the optical axes of the three CRT's are directed to, or aligned with, a common area upon which all three CRT's project a respective image.

It should also be noted here that the mounting bosses associated with respective upper and lower mounting blocks of the right and left CRT's 28, 22 are positioned upon the aft surface of the front mounting plate 42 to receive a respective CRT housing in a rotationally inclined orientation so as to provide support for and ensure proper angular orientation to its associated CRT. Thus, while the upper and lower mounting blocks 54, 56 of the center CRT 30 are in vertical alignment, the lower mounting blocks 52 and 60 are positioned outward relative to the centerline of the front mounting plate 42 from their associated upper mounting blocks 50 and 58 as shown in FIG. 2 Proper relative rotational orientation of the three CRT's eliminates image misregistration arising from the spatial separation of the three CRT's. Proper relative rotational orientation of the three CRT's is ensured by the spacing and location of the various pairs of positioning slots in the mounting plate 42 associated with each of the aforementioned CRT mounting blocks.

Referring specifically to FIGS. 2 and 4. the configuration and mounting of the lens assemblies on the forward surface of the front mounting plate 42 will now be described. As shown for the case of the center lens assembly 23 in FIG. 4, each of the lens assemblies associated with the right, center and left CRT's includes a respective mounting flange by means of which the lens assembly is mounted to the forward surface of the front mounting plate 42.

Each of the right, center and left lens mounting flanges 70, 72 and 74 is provided with four slots in the periphery thereof spaced in a generally rectangular array. Referring specifically to the center lens housing 72, the two upper slots therein are adapted to receive respective upper lens mounting screws 76, while the two, spaced lower slots therein are adapted to receive respective lower lens mounting screws 78. This mounting screw and peripheral slot arrangement ensures that each of the lens assemblies is securely positioned upon the forward surface of the front mounting plate 42 and is aligned not only with its associated CRT, but also with respect to the other two CRT and lens combinations.

As indicated above, each of the right, center and left lenses is provided with a respective lens mounting flange 70, 72 and 74 which is attahced to an aft portion of the lens during its manufacture in a conventional manner. Each of the lens mounting flanges 70, 72 and 74 includes a respective generally circular aperture aligned with the faceplate of its associated CRT as well as with an associated mounting plate aperture. As shown in FIG. 2, the right mounting plate aperture 44 includes a keying slot 44a in the periphery thereof. Similarly, the center and left mounting plate apertures 46, 48 include respective keying slots 46a, 48a in the periphery thereof. Each of the aforementioned keying slots is adapted to receive a respective keying projection on an associated lens mounting flange so as to provide proper rotational alignment of the right and left lens mounting flanges 70, 74 relative to the center lens mounting flange 72. Thus, the right, center and left mounting plate aperture keying slots 44a, 46a and 48a are adapted to receive keying projections 70a, 72a and 74a of the right, center and left lens mounting flanges 70, 72 and 74, respectively. From FIG. 2, it can be seen that the keying slot 44a of the right mounting plate aperture 44 is positioned slightly above a generally horizontal line D—D through the front mounting plate 42 so as to provide a predetermined angular rotation of the right lens mounting flange 70 relative to the center lens mounting flange 72. Similarly, the keying slot 48a of the left mounting plate aperture 48 is positioned slightly below the horizontal line D—D extending through the front mounting plate 42 so as to angularly incline the left lens mounting flange 74 at a predetermined angle relative to the center lens mounting flange 72. By thus providing the right and left lens mounting flanges 70, 74 with the proper rotational orientation relative to the center lens mounting flange 72 and by thus precisely aligning each lens assembly with its associated CRT, the video images of each of these CRT's will be in precise alignment when projected upon the upper mirror 24.

The video image projected through each of the aligned apertures in the front mounting plate 42 and a respective lens mounting flange is directed into its associated lens assembly 23 for reflection by a lens mirror 34 positioned therein. Each of the lens mirrors 34 directs a respective red, green or blue video image onto a common area upon an upper mirror 24 within the projection television receiver 10. The upper mirror 24, in turn, reflects the three superimposed images upon the aft surface of a rear projection screen 22 causing the video image to appear on the forward surface thereof for viewing. The integrated mounting and alignment arrangement for each of the CRT and lens combinations described above ensures that all three video images are precisely aligned for proper superposition upon the upper mirror 24 and display on the projection screen 22.

There has thus been shown an integrated lens and CRT mount for a projection television receiver which provides for the precise positioning and alignment of three lens/CRT combinations upon a common mounting plate which is preferably comprised of a molded plastic or sheet metal. Various keying elements on the mounting plate ensure that each of the three lens/CRT combinations is securely positioned upon the mounting plate and projects its respective video image upon a common display area in precise alignment with the other two video images for optimum video image presentation.

While particular embodiments of the present invention have been shown and described, it will be obvious to those skilled in the art that changes and modifications may be made without departing from the invention in its broader aspects. For example, while the integrated lens and CRT mount of the present invention is shown coupled to and supported by right and left side panels, it could be mounted to and supported by virtually any structural arrangement capable of supporting the weight of the mount as well as that of the various lens and CRT combinations. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a projection television having a plurality of lens and CRT combinations including center, right and left CRT's arranged in a generally linear, side-by-side array and center, right and left lenses positioned immediately adjacent to and forward of an associated CRT, an integrated lens and CRT mount comprising:

a generally planar panel having center, right and left apertures aligned in a generally linear array, wherein each of said center, right and left apertures includes a respective keying slot in the periphery thereon;

respective pluralities of upper and lower spaced positioning apertures positioned adjacent to each of said center, right and left apertures in said panel;

respective pairs of upper and lower mounting blocks positioned on the rear side of said panel immediately adjacent to respective upper and lower portions of each of said center, right and left apertures, wherein each of said mounting blocks includes a plurality of spaced positioning bosses on a forward surface thereof adapted for insertion in said upper and lower positioning apertures, respectively, so as to maintain each of said mounting blocks in a predetermined position and orientation on said panel;

center, right and left housings mounted to respective forward portions of the center, right and left CRT's and adapted for positioning between and engagement by a respective pair of said upper and lower mounting blocks, wherein each CRT is securely mounted to the rear side of said panel immediately adjacent to and aligned with a respective one of said apertures therein such that said center, right and left CRT's are directed to a common image display area; and center, right and left lens flanges positioned on respective aft portions of the center, right and left lenses and mounted to a front surface of said panel, wherein each of said lens flanges includes a keying projection adapted for insertion within a respective one of said keying slots when the lens flange is positioned within a respective aperture in said planar panel for providing proper relative rotational orientation of said right and left lenses relative to said center lens.

2. The integrated lens and CRT mount of claim 1 wherein each of said mounting blocks further includes a plurality of mounting bosses extending rearward therefrom for engaging a respective one of said CRT housings such that said right and left CRT's are directed inwardly toward an optical axis of the center CRT.

3. The integrated lens and CRT mount of claim 2 wherein each said mounting block includes a first pair of laterally spaced positioning bosses on a forward surface thereof and a second pair of laterally spaced mounting bosses on an aft surface thereof.

4. The integrated lens and CRT mount of claim 3 wherein said mounting bosses in the upper and lower mounting blocks associated with the center CRT are of equal length and an inner mounting boss in each of the upper and lower mounting blocks associated with the right and left CRT's is of greater length than an outer mounting boss in the same mounting block.

5. The integrated lens and CRT mount of claim 4 wherein each said mounting boss includes a threaded inner portion adapted to receive a respective threaded mounting pin for securely positioning the mounting block on the rear side of said panel.

6. The integrated lens and CRT mount of claim 1 wherein each said CRT housing has a generally circular cross-section and wherein the facing portions of each of said upper and lower mounting blocks include a concave segment, with the concave segments of each said respective pair of upper and lower mounting blocks adapted to receive and engage an associated one of said CRT housings in a tight-fitting manner.

7. The integrated lens and CRT mount of claim 1 wherein the upper and lower mounting blocks engaging the center CRT housing are in generally vertical alignment and each of the lower mounting blocks engaging the rigth and left CRT housings are positioned outward of its associated one of said upper mounting blocks in maintaining the right and left CRT's in proper rotational orientation relative to said center CRT.

8. The integrated lens and CRT mount of claim 1 further including first and second lateral support members coupled to respective ends of said panel for the support thereof.

9. The integrated lens and CRT mount of claim 1 wherein each one of said lens flanges includes a plurality of apertures therein adapted to receive a respective mounting pin for securely mounting the lens flange to the front surface of said panel.

10. The integrated lens and CRT mount of claim 1 wherein each of said center, right and left apertures in said panel is generally circular and each of said lens flanges is generally circular in cross-section, with the position of each keying slot in a respective one of said apertures in said panel defining a predetermined rotational orientation of an associated one of said lenses in said panel.

11. The integrated lens and CRT mount of claim 1 wherein said panel is comprised of molded plastic.

12. The integrated lens and CRT mount of claim 1 wherein said panel is comprised of sheet metal.

13. The integrated lens and CRT mount of claim 1 wherein each of said center, right and left lenses includes a respective mirror for redirecting a video image from its associated one of said CRTs incident thereon.

* * * * *